UNITED STATES PATENT OFFICE 2,372,085

ABSORPTION OF GASES

William C. Jones and Charles T. Shewell, Baytown, Tex., assignors to Standard Oil Development Company, a corporation of Delaware Application March 11, 1942, Serial No. 434,202

1 Claim. (Cl. 183—115)

This invention is concerned with the concentration of components of gaseous hydrocarbon mixtures. More particularly the invention relates to the removal and concentration of normally gaseous or readily volatilized olefins from their mixtures with other hydrocarbons.

In cracking, dehydrogenation and other similar reactions involving thermal or catalytic treatment of hydrocarbon fractions or petroleum derivatives, there are usually formed as intermediate or principal products, compounds of unsaturated structure. These compounds belonging to the homologous series of which acetylene, allene and ethylene are representatives, find wide application and use in the synthesis of numerous organic compounds. However, in order that the unsaturated hydrocarbons may achieve their greatest utility, it is necessary that they be uncontaminated with other hydrocarbons with which they are usually associated.

Typical of the products obtained from olefinic hydrocarbons are: synthetic rubbers, aviation fuels and blending agents, alcohols, ethers, ketones, acetic acid, polybutylenes, and many others.

Segregation of olefins from paraffins with which they are usually associated may be accomplished by a tedious and expensive procedure which involves absorption of the olefins in strong sulfuric acid, heating of the acid extract to polymerize the olefins, and thermal or catalytic decomposition of the polymers to obtain the pure mono-olefins. Olefins have also been removed from their mixtures with paraffins by azeotropic distillation. This involves the introduction of a compound of widely dissimilar characteristics, such as sulfur dioxide or acetic acid, with the olefin-containing hydrocarbons into suitable fractionating equipment and carefully controlling the distillation to attain a product of the desired purity.

However, we have now found that if an olefin-containing gaseous hydrocarbon fraction is absorbed in certain suitable solvents, the gases dissolved therein are predominantly olefinic. We have found that a solvent comprising acetic acid, phenol, and water, preferentially extracts olefins from gaseous or readily vaporized mixtures of paraffins and olefins. More specifically, we discovered that a solvent comprising 5–80% by volume of water, 5–50% phenol, and 5–50% acetic acid is suitable for extracting olefins from paraffins. It is preferred, however, to employ a solvent which comprises about 50% by volume of water, 25% phenol, and 25% acetic acid.

It is therefore an object of our invention to provide a process whereby normally gaseous or readily volatilized olefins are selectively removed from their mixtures with paraffins.

Another object of our invention is to concentrate olefins so that they are more readily usable in processes requiring olefins substantially uncontaminated with paraffins.

A still further object of our invention is to provide a solvent which absorbs olefins preferentially from mixtures of normally gaseous or readily volatilized olefins and paraffins.

In general, our invention comprises contacting a gaseous hydrocarbon fraction containing olefins with a solvent of the type described at temperatures between about 40° F. and 120 F. and at pressures between atmospheric and 100 pounds per square inch. While these temperatures and pressures represent conditions found suitable for absorbing olefins from paraffins, it is to be understood that they are not critical and it is not intended to limit the invention to these particular temperatures and pressures.

After the olefins have been absorbed in the solvent, the resulting extract is stripped of olefins by application of heat and the stripped solvent is recycled to contact additional quantities of gaseous feed. Since there is a wide spread between the boiling point of the highest boiling normally gaseous olefin, for example one of the amylenes, and the solvent which is the subject of our invention, little difficulty is encountered in separating the solvent and absorbed olefins. However, since some acetic acid and/or phenol may be distilled out of the solvent with the olefins, it may be desirable to wash the olefinic gas with water or an aqueous alkaline solution to remove traces of acidic bodies therefrom.

In order to more completely and adequately describe our invention, reference will now be made to the following figures in which are shown two arrangements of apparatus elements illustrating embodiments of our invention.

Similar reference characters refer to similar parts throughout the two views.

Figure 1:
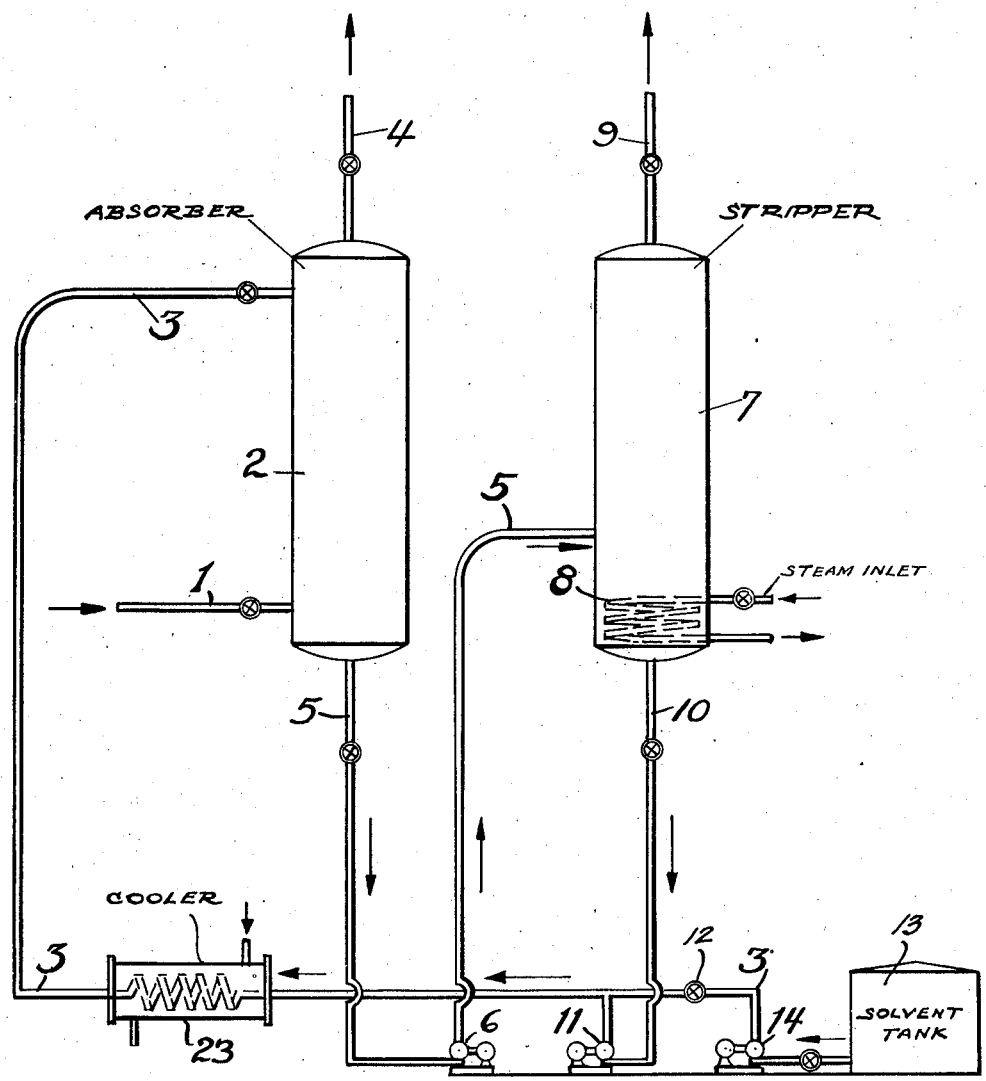
Figure 1 represents a single stage countercurrent absorption system in which the incoming gas is contacted with the solvent in an absorption tower.

Referring now to Figure 1, a hydrocarbon gas containing olefins is introduced through line 1 into absorber 2 which may be a tower packed with any suitable material such as ceramic packing, wire screening, bubble cap trays or any other suitable means for securing intimate contact between gases and liquid. The gas introduced into absorber 2 flows upwardly therein and contacts a solvent, preferably comprising water, phenol, and acetic acid introduced into absorber 2 through line 3. As the solvent flows downwardly, it becomes progressively enriched with olefins, and the hydrocarbon gases flowing upwardly become progressively leaner in olefins. The gas substantially depleted of its olefin content is then removed from the system through line 4 and is disposed of or further handled as may be desired. The olefin-enriched solvent is withdrawn from absorber 2 by means of line 5 and is pumped by pump 6 to stripper 7 where olefins are removed from the solvent by application of heat or vacuum or by a combination of the two means. When it is desired to remove olefins by heating the enriched solvent, steam may be injected into the bottom of stripper 7 through heating coil 8, and the temperature of the solvent is elevated thereby to between about 120° to 212° F. whereby olefins are driven off. The predominantly olefinic gas is removed from stripper 7 through line 9 and is subsequently collected and employed as a feed stock in any process requiring a concentrated gaseous olefin feed.

The stripped solvent is discharged from stripper 7 by means of line 10 and pump 11 and after cooling in cooler 23 is recycled to absorber 2 through line 3. In some instances, it may be necessary to change the solvent in absorber 2 or to add make-up solvent or constituents of the solvent. In these cases, make-up may be introduced into the system by opening valve 12 and pumping solvent from tank 13 by means of pump 14.

Figure 2:
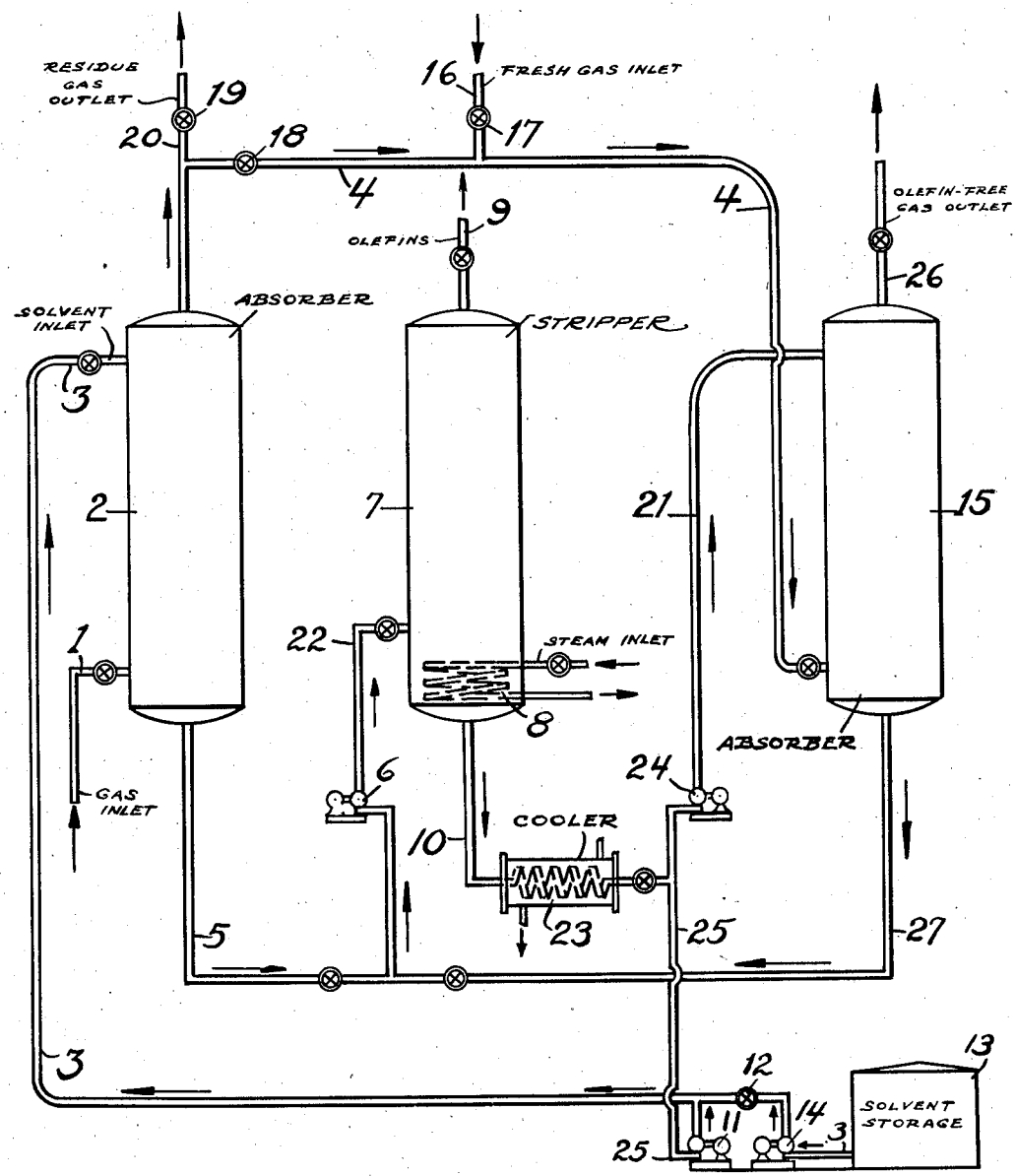
Figure 2 represents a two-stage countercurrent absorption process in which the residue gas from the first absorber is recontacted with solvent in a second absorber.

In the modification of our invention which we will describe with reference to Figure 2, an olefin-containing feed gas is introduced by means of line 1 into absorber 2 where countercurrent contact is made between the gas and solvent. The solvent is introduced into absorber 2 near the top through line 3 and flows downwardly contacting the up-flowing gas. As the solvent contacts the olefinic gas, it becomes progressively saturated with olefins and the gas becomes progressively stripped of its olefinic constituents. However, to achieve substantially complete removal of olefins from the gas in one stage might require an absorber of a size which would be commercially impractical. Therefore, in this embodiment the residue gas from absorber 2 which still contains olefinic hydrocarbons is introduced by means of line 4 into absorber 15 where the gas again contacts quantities of solvent.

It is to be understood that any number of absorbers may be used. It is also understood that in some instances it may be desirable and preferable to operate absorbers 2 and 15 in parallel rather than in series. Provision is therefore made to inject fresh feed gas into line 4 by means of branch line 16, valve 17 being opened to allow passage therethrough. When absorbers 2 and 15 operate in parallel, valve 18 in line 4 is closed off and valve 19 in line 20 is opened for release of residue gas.

However, when operating in series, residue gas from absorber 2 is discharged into absorber 15 through line 4 where contact between the gas and solvent is made. Solvent is introduced in absorber 15 through line 21 as will be further described.

Enriched solvent from absorber 2 is withdrawn therefrom by line 5 and after mixing with rich solvent withdrawn from absorber 15 through line 27, the combined stream is discharged by pump 6 through line 22 into stripper 7 where the olefins are distilled from the solvent. As described with reference to Figure 1, heat is applied to stripper 7 by means of steam injected through coil 8. Olefins are distilled off and removed from the stripper 7 by means of line 9. In some cases, it will be necessary to subject the olefins removed from the stripper to a water or aqueous alkaline wash to remove any acidic material which may be present. After suitable treatment as described the olefins may be used as desired.

The stripped solvent is withdrawn from stripper 7 by line 10, is cooled to a temperature between about 40° F. to 120° F. in cooler 23 and a portion of the cooled solvent is pumped by pump 24 through line 21 to absorber 15 where the residue gas from absorber 2 is further treated. The second portion of the solvent is recycled to absorber 2 by means of line 25, pump 11, and line 3.

When needed or when the solvent has to be replenished or changed, valve 12 in line 3 is opened and fresh solvent or constituents thereof are pumped to absorber 2 from storage tank 13 by means of pump 14.

In conducting our invention as described herein, it is necessary to construct all equipment, in which the solvent or its vapors comes into contact, of corrosion resisting material, since our preferred solvent corrodes ordinary steel equipment rapidly. Thus the absorbers 2 and 15 and stripper 7 and all auxiliary lines and pumps may be built of special corrosion resisting alloys. As an alternative, absorber 2, 15, and stripper 7 may be constructed of ceramic material or may be glass lined.

In order to illustrate our invention further, a number of absorption experiments were conducted in which the amount of the several components comprising our preferred solvent was varied. These absorption experiments were performed in glass laboratory absorption equipment. 100 milliliter samples of a propylene-propane fraction having an unsaturated hydrocarbon content of 19.2 mol percent were contacted with 10 milliliter portions of the solvents described in the data table. The amount of total gas absorbed by each solvent was noted, and the residue gas was collected and analyzed for olefins by absorption in 98% strength $H_2SO_4$.

Equilibrium conditions were established in all cases employing an absorption temperature of 85° F. and a pressure of 1 atmosphere.

Since the amount of unsaturated hydrocarbons in both the feed and residue gases was determined by analysis, the mol fraction of both the saturates and unsaturates dissolved in the solvent was easily established. However, the total amount of gas absorbed is not a true index of the worth of a given solvent. Consideration must be given to the selectivity of the solvent in question for the olefins. The following equation has therefore been developed (based on Henry's law) to illustrate the phenomena of selectivity:

$$\alpha = \frac{Y_1 X_2}{X_1 Y_2}$$

Where
α=selectivity of absorption
$Y_1$=mol fraction of paraffins in residue gas
$X_1$=mol fraction of paraffins in solvent
$Y_2$=mol fraction of olefins in residue gas
$X_2$=mol fraction of olefins in solvent Thus, for a given solvent, the higher the value for alpha, the higher is the selectivity; and therefore, a solvent having a high alpha value is a more efficient solvent for concentrating olefins than one having a low alpha value.

An examination of the data in Table I shows that the solvent comprising 50% water, 25% phenol, and 25% acetic acid had the highest alpha index of all the various combinations of the three components tested. While the total amount of hydrocarbon dissolved in this particular solvent was only 4.5 milliliters, it must be remembered that only 10 milliliters of solvent were employed. Furthermore, calculations show that the concentration of olefins in the gas dissolved in the solvent was 62.3% against 19.2% in the feed gas. Whereas, a gas having an olefin content of 19.2% would be unsuitable in processes requiring a higher olefin feed concentration, a feed gas containing 62.3% olefins would find wide utility. By employing pressure, recycling of residue gas, and additional absorption stages, or any of the well known expedients for obtaining improved contact between different phases, the concentration of the olefins in the gases dissolved in the solvent may be raised to a figure approaching unity.

In order to show that our preferred solvent mixture is more selective toward olefins than compounds typical of the solvents well known in the art, absorption experiments similar to those described and illustrated in conjunction with Table I were conducted with eighteen different reagents which have shown utility as solvents for various hydrocarbon compounds.

The alpha index of each of the eighteen solvents is compared with that of our preferred solvent in Table II.

Table II

| Solvent | α |
|---|---|
| 50% water, 25% phenol, 25% acetic acid | 8.27 |
| Linseed oil | 3.21 |
| Aniline | 2.98 |
| Morpholine | 2.30 |
| Furfural | 2.11 |
| Xylidine | 2.00 |
| Acetic acid | 1.96 |
| Phenol | 1.95 |
| Benzaldehyde | 1.89 |
| Methyl Cellosolve acetate | 1.78 |
| Pyridine | 1.77 |
| Cresylic acid | 1.72 |
| Nitrobenzene | 1.65 |
| Methyl Cellosolve | 1.64 |
| Carbitol acetate | 1.52 |
| Butyl Carbitol | 1.49 |
| Kerosene | 1.36 |
| Drying oil | 1.08 |
| Carbon tetrachloride | 0.83 |

It is evident from a study of the data in Table II that our preferred solvent mixture is not only superior in selectivity toward olefins than any of the other solvents tested but that it is vastly superior in selectivity toward olefins than either

Table I

| Solvent | Concentration in solvent | | | | Concentration in residue gas | | | | $Y_2/X_2$ | $Y_1/X_1$ | α |
|---|---|---|---|---|---|---|---|---|---|---|---|
| | Propylene | | Propane | | Propylene | | Propane | | | | |
| | C. c. | Mol. frac. ($X_2$) | C. c. | Mol. frac. ($X_1$) | C. c. | Mol. frac. ($Y_2$) | C. c. | Mol. frac. ($Y_1$) | | | |
| 100% glacial acetic acid | 9.4 | .0022 | 26.6 | .00617 | 9.8 | .154 | 54.2 | .846 | 70.0 | 137.0 | 1.96 |
| 75% acetic acid, 25% water | 3.6 | .00067 | 5.0 | .00097 | 15.6 | .172 | 75.8 | .828 | 256.0 | 854.0 | 3.34 |
| 60% acetic acid, 40% water | 1.6 | .000275 | 2.0 | .000342 | 17.6 | .183 | 78.8 | .817 | 665.0 | 2,390.0 | 3.60 |
| 50% acetic acid, 50% water | 1.2 | .000187 | 0.9 | .00014 | 18.0 | .185 | 79.9 | .815 | 990.0 | 5,820.0 | 5.88 |
| 50% acetic acid, 50% phenol | 8.0 | .00237 | 23.7 | .00732 | 11.2 | .165 | 57.1 | .835 | 69.6 | 114.0 | 1.64 |
| 20% water, 40% phenol, 40% acetic acid | 4.0 | .00102 | 9.0 | .00228 | 15.2 | .175 | 71.8 | .825 | 171.3 | 362.0 | 2.11 |
| 33⅓% water, 33⅓% phenol, 33⅓% acetic acid | 3.2 | .00072 | 4.8 | .00107 | 16.0 | .174 | 76.0 | .826 | 242.0 | 772.0 | 3.19 |
| 50% water, 25% phenol, 25% acetic acid | 2.8 | .00055 | 1.7 | .00032 | 16.4 | .172 | 79.0 | .828 | 312.6 | 2,585.0 | 8.27 | acetic acid or phenol which are components with water of our preferred solvent.

While we have illustrated our invention with relation to absorption and concentration of propylene from its mixtures with propane, it is to be understood that we do not wish to limit ourselves in any respect to the particular embodiments or examples presented. For example, acetylene or its homologues, butadiene, ethylene, butylenes or pentylenes and the like may be recovered in a pure state from their mixtures with other hydrocarbons in accordance with our invention.

We claim:

A method for separating olefins from a hydrocarbon gas containing the same in admixture with saturated hydrocarbons, which comprises scrubbing said gas with a solvent essentially consisting of acetic acid, phenol and water, containing about 50% of water, about 25% of phenol and about 25% of acetic acid.

WILLIAM C. JONES.
CHARLES T. SHEWELL.